(12) United States Patent
Konuma

(10) Patent No.: US 8,982,370 B2
(45) Date of Patent: Mar. 17, 2015

(54) IMAGE FORMING APPARATUS AND IMAGE FORMING METHOD

(71) Applicant: Shigeo Konuma, Tokyo (JP)

(72) Inventor: Shigeo Konuma, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 137 days.

(21) Appl. No.: 13/680,366

(22) Filed: Nov. 19, 2012

(65) Prior Publication Data

US 2013/0135671 A1 May 30, 2013

(30) Foreign Application Priority Data

Nov. 25, 2011 (JP) .................................. 2011-258326

(51) Int. Cl.
*G06F 3/12* (2006.01)
*H04N 1/00* (2006.01)

(52) U.S. Cl.
CPC ............ *G06F 3/1293* (2013.01); *G06F 3/1203* (2013.01); *G06F 3/1263* (2013.01); *G06F 3/1274* (2013.01); *G06F 3/1285* (2013.01); *H04N 1/00413* (2013.01); *H04N 1/00477* (2013.01)
USPC ........................................ 358/1.13; 358/1.15

(58) Field of Classification Search
CPC .... G06F 3/1263; G06F 3/1274; H04N 1/0035
USPC ................................................. 358/1.1, 1.15
See application file for complete search history.

(56) References Cited

U.S. PATENT DOCUMENTS

| | | | | |
|---|---|---|---|---|
| 5,669,040 A | * | 9/1997 | Hisatake | 399/83 |
| 2010/0100841 A1 | * | 4/2010 | Shin et al. | 715/784 |

FOREIGN PATENT DOCUMENTS

| | | | | |
|---|---|---|---|---|
| JP | 8-194588 A | | 7/1996 | |
| JP | 08-307583 A | | 11/1996 | |
| JP | 2003-125123 A | | 4/2003 | |
| JP | 2007-079644 A | | 3/2007 | |
| JP | 2007-087221 A | | 4/2007 | |
| JP | 2011-118604 | * | 6/2011 | G06F 3/048 |
| JP | 2011-118604 A | | 6/2011 | |

OTHER PUBLICATIONS

English translation for JP2011-118604.*

(Continued)

*Primary Examiner* — King Poon
*Assistant Examiner* — Iriana Cruz
(74) *Attorney, Agent, or Firm* — Holtz, Holtz, Goodman & Chick PC

(57) ABSTRACT

An image forming apparatus includes: an image forming unit which forms an image based on a JOB; a display operation unit which enables a display and an operation for the JOB; and a control unit which manages the JOB and controls the image forming unit and the display operation unit, wherein the control unit arranges a predetermined number of JOBs on one screen according to a reservation order to be output in the display operation unit, displays a list switched of a page or scrolled by an instructing operation of a user, updates the display of the displayed list, selects the JOB in the displayed list by the instructing operation of the user, executes the instructing operation for the selected JOB, and maintains at least the selected JOB displayed on the screen to be displayed on the screen.

32 Claims, 14 Drawing Sheets

(56) References Cited

OTHER PUBLICATIONS

Japanese Office Action dated Oct. 30, 2013 (and English translation thereof) in counterpart Japanese Application No. 2011-258326.

Japanese Office Action dated Feb. 12, 2014 (and English translation thereof) in counterpart Japanese Application No. 2011-258326.

* cited by examiner

< FIRST PAGE >

(a)

< SECOND PAGE >

(b)

(a)

(b)

IMAGE FORMING APPARATUS AND IMAGE FORMING METHOD

BACKGROUND OF THE INVENTION

1. Field of the Invention

The present invention relates to an image forming apparatus and an image forming method which manages a JOB, forms an image based on the JOB, and enables a display and an operation of a list of the JOB.

2. Description of the Related Art

In an electro-photographic image forming apparatus such as a copier, a printer, a facsimile, and a multi-functional peripheral having these functions, a latent image corresponding to a document is formed on a photo conductor in an image forming unit, the latent image is developed by applying a toner thereto, and the developed toner image is transferred onto a paper. Subsequently, the toner image on the paper is fixed in a fixing unit, and the paper is discharged.

The image forming operation is performed based on a JOB having image data, and the JOB is managed by the image forming apparatus. In the image forming apparatus, reserved JOBs are generally managed according to an output order, and the reserved JOBs can be displayed as a list on a display operation unit so as to be viewed later. In the display of the list, a predetermined number of JOBs is displayed on one screen, and when the number of JOBs becomes more than the predetermined number, the predetermined number or more of JOBs are displayed on the screen based on an instructing operation of a user by the switching or scrolling of a page (for example, see JP 8-194588 A). Further, JP 8-194588 A proposes a configuration in which an up key and a down key are provided, a display of a process priority is updated by an instructing operation of a user on the up key and the down key, and an execution priority may be easily checked.

Furthermore, there is known an image forming apparatus which enables an instructing operation on JOBs displayed as a list (for example, see JP 2003-125123 A). In the image forming apparatus illustrated in JP 2003-125123 A, a cancel instruction may be executed on at least one of reserved JOBs on the list. Then, when there is a cancel instruction, a checking display screen (POP-UP screen) for checking the cancel is displayed on a display list, and hence it is possible to reliably cancel a desired JOB without degrading the productivity.

SUMMARY OF THE INVENTION

The configuration in which the display is updated with the execution of the JOB on the list screen of the JOBs and the configuration in which the execution checking screen is displayed when an instructing operation such as a deletion for the selected JOB is executed are already introduced in the past. However, when the display position of the JOB is shifted to the upper position with the completion of the output of the JOB while the JOB is selected and the page of the list of the JOBs is switched or scrolled, the selected JOB may not be seen on the screen. For example, when a second page is referred and a selected JOB exists in the second page, the display of the selected JOB moves to a first page with the execution of the output.

For this reason, when an instructing operation such as a deletion for the JOB is executed, it is difficult to determine whether the JOB is a correct subject. Accordingly, there is a concern that an erroneous instructing operation of deleting a JOB different from the desired JOB by mistake may occur.

Furthermore, when the checking POP-UP screen is displayed on the display list, the display of the JOB may be hidden below the checking POP-UP screen. Similarly, since there is a portion in which the subject JOB is not seen, there is a problem in that it is difficult to determine the execution.

The present invention is made in view of the above-described circumstances, and it is an object to provide an image forming apparatus which does not delete a selected JOB from a screen due to an updated display of a list when a JOB is selected in a list of reserved JOBs.

To achieve at least one of the above-described objects, an image forming apparatus reflecting a first aspect of the present invention includes an image forming unit which forms an image based on a JOB; a display operation unit which enables a display and an operation for the JOB; and a control unit which manages the JOB and controls the image forming unit and the display operation unit, wherein the control unit arranges a predetermined number of JOBs on one screen according to a reservation order to be output in the display operation unit, capable of displaying a list switched of a page or scrolled by an instructing operation of a user when the number of JOBs becomes more than the predetermined number, updates the display of the displayed list when there is a change in the status of the JOB, capable of selecting the JOB in the displayed list by the instructing operation of the user, capable of executing the instructing operation for the selected JOB, and maintains at least the selected JOB displayed on the screen to be displayed on the screen when the display needs to be updated by the switching or scrolling of the page in a case where the display of the displayed list is updated.

According to the image forming apparatus reflecting a second aspect, in the first aspect, the control unit updates the display of the list such that a JOB is added to a tail position of the list by a new reservation, the JOB at a top position is deleted by the completion of the output, and the subsequent JOB is raised to the upper position by the deletion of the JOB and then is displayed.

According to the image forming apparatus reflecting a third aspect, in the first aspect, the control unit changes the display positions of all JOBs when updating the display of the list in a case where there is no selected JOB.

According to the image forming apparatus reflecting a fourth aspect, in the first aspect, the control unit does not raise the display position of the JOB in the display list in a display page with a selected JOB regardless of the completion of the output of the JOB in a case where there is the selected JOB.

According to the image forming apparatus reflecting a fifth aspect, in the first aspect, the control unit does not raise the display position of the JOB in the display list in the display page with the selected JOB regardless of the completion of the output of the JOB when there is the selected JOB and switches the display page by deducting one from the page number of the display page at a time point in which the output of the number of JOBs corresponding to the number of JOBs for one page is completed.

According to the image forming apparatus reflecting a sixth aspect, in the first aspect, the control unit updates the display of the list by sequentially raising the JOBs with the completion of the output of the JOB until the selected JOB is positioned at a top position of the display list in the display page with the selected JOB when there is the selected JOB and does not raise the display position of the selected JOB in the display list with the completion of the output of the JOB after the selected JOB is positioned at the top position of the display list.

According to the image forming apparatus reflecting a seventh aspect, in the first aspect, the control unit updates the display of the list by sequentially raising the JOBs with the completion of the output of the JOB until the selected JOB is positioned at a top position in the display list in the display page with the selected JOB when there is the selected JOB and switches the display page to a previous page when the selected JOB moves from the top position of the display list of the display page to the previous page.

According to the image forming apparatus reflecting an eighth aspect, in the first aspect, the control unit displays a pop-up screen for the instructing operation at a position where the selected JOB is not hidden when there is the instructing operation on the selected JOB.

According to the image forming apparatus reflecting a ninth aspect, in the first aspect, the control unit defines the display position of the selected JOB so that the selected JOB is displayed at a position where the selected JOB is not hidden by the display of the pop-up screen for the instructing operation when there is the instructing operation on the selected JOB.

According to the image forming apparatus reflecting a tenth aspect, in the first aspect, the control unit displays the selected JOB at a top position or a tail position on one screen and displays a pop-up screen for the instructing operation at a position where the selected JOB is not hidden when there is the instructing operation on the selected JOB.

To achieve at least one of the above-described objects, an image forming method reflecting a twelfth aspect of the present invention arranges a predetermined number of JOBs on one screen according to a reservation order to be output for the purpose of a display and an operation relating to a JOB for forming an image, capable of displaying a list switched of a page or scrolled by an instructing operation of a user when the number of JOBs becomes more than the predetermined number, updates the display of the displayed list when there is a change in the status of the JOB, capable of selecting the JOB in the displayed list by the instructing operation of the user, capable of executing the instructing operation for the selected JOB, and maintains at least the selected JOB displayed on the screen to be displayed on the screen when the display needs to be updated by the switching or scrolling of the page in a case where the display of the displayed list is updated.

According to the image forming method reflecting a thirteenth aspect, in the twelfth aspect, the display of the list is updated such that the JOB is added to a tail position of the list by a new reservation, the JOB at a top position is deleted by the completion of the output, and the subsequent JOB is raised to the upper position by the deletion of the JOB and then is displayed.

According to the image forming method reflecting a fourteenth aspect, in the twelfth aspect, the display positions of all JOBs are changed when updating display of the list in a case where there is no selected JOB.

According to the image forming method reflecting a fifteenth aspect, in the twelfth aspect, a display position of the JOB is not raised in the display list in a display page with a selected JOB regardless of the completion of the output of the JOB in a case where there is the selected JOB.

According to the image forming method reflecting a sixteenth aspect, in the twelfth aspect, a display position of the JOB is not raised in the display list in a display page with the selected JOB regardless of the completion of the output of the JOB when there is the selected JOB and the display page is switched by deducting one from the page number of the display page at a time point in which the output of the number of JOBs corresponding to the number of JOBs for one page is completed.

According to the image forming method reflecting a seventeenth aspect, in the twelfth aspect, the display of the list is updated by sequentially raising the JOBs with the completion of the output of the JOB until the selected JOB is positioned at a top position of the display list in a display page with the selected JOB when there is the selected JOB and the display position of the selected JOB is not raised in the display list with the completion of the output of the JOB after the selected JOB is positioned at the top position of the display list.

According to the image forming method reflecting a eighteenth aspect, in the twelfth aspect, the display of the list is updated by sequentially raising the JOBs with the completion of the output of the JOB until the selected JOB is positioned at a top position in the display list in the display page with the selected JOB when there is the selected JOB and the display page is switched to a previous page when the selected JOB moves from the top position of the display list of the display page to the previous page.

According to the image forming method reflecting a nineteenth aspect, in the twelfth aspect, a pop-up screen for the instructing operation is displayed at a position where the selected JOB is not hidden by the pop-up screen when there is the instructing operation on the selected JOB.

According to the image forming method reflecting a twentieth aspect, in the twelfth aspect, the display position of the selected JOB is defined so that the selected JOB is displayed at a position where the selected JOB is not hidden by the display of the pop-up screen for the instructing operation when there is the instructing operation on the selected JOB.

According to the image forming method reflecting a twenty first aspect, in the twelfth aspect, the selected JOB is displayed at a top position or a tail position of the list of the display screen and a pop-up screen for the instructing operation is displayed at a position where the selected JOB is not hidden when there is the instructing operation on the selected JOB.

According to the image forming method reflecting a twenty second aspect, in the nineteenth aspect, the pop-up screen is displayed so as to check the execution of the instructing operation.

DETAILED DESCRIPTION OF THE PREFERRED EMBODIMENTS

Hereinafter, an embodiment of the invention will be described by referring to the accompanying drawings.

Figure 1:
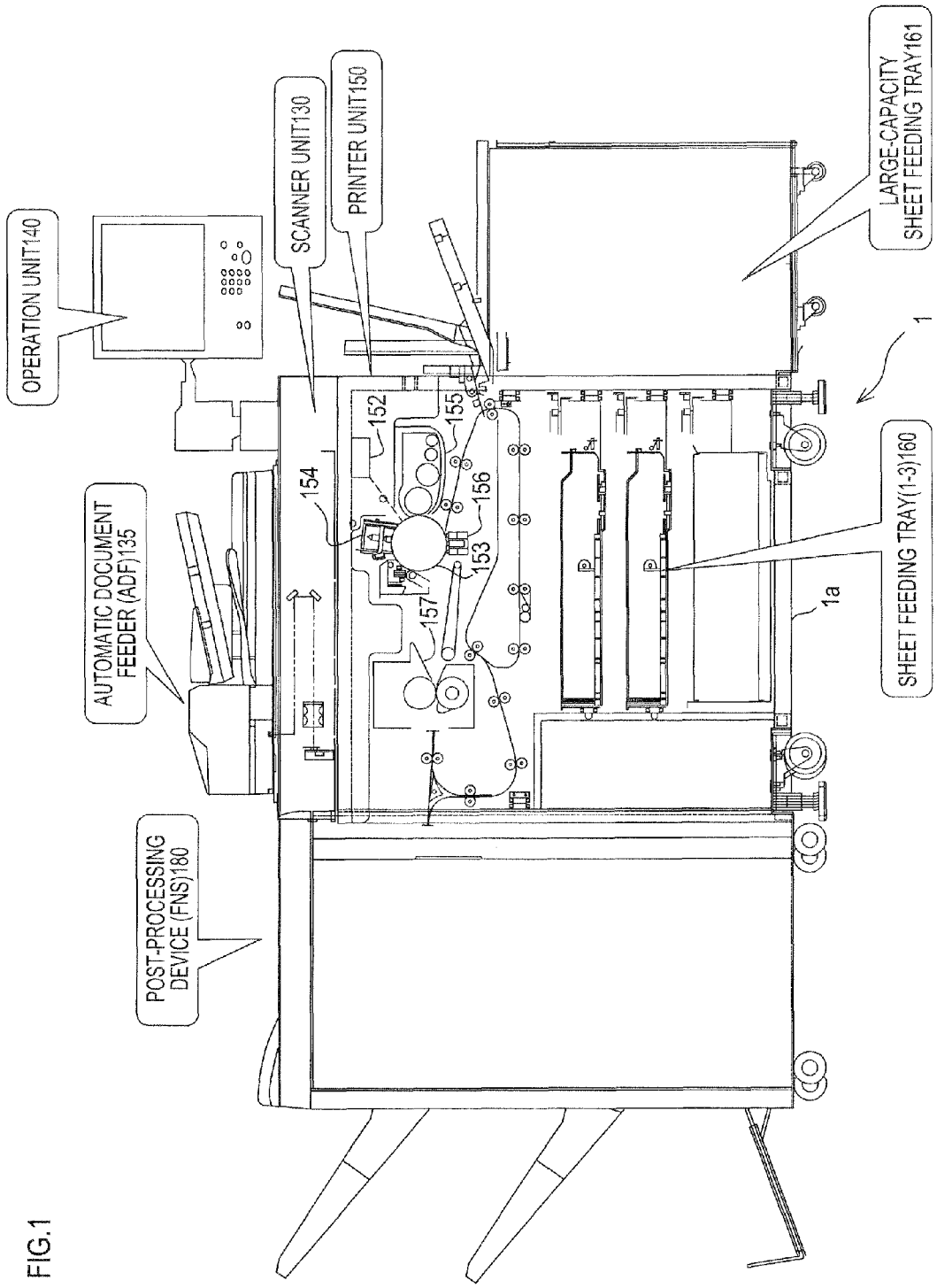
FIG. 1 is a diagram illustrating a configuration example of an image forming apparatus according to an embodiment of the invention.

FIG. 1 is a central cross-sectional view of an entire image forming apparatus 1 and illustrates a mechanical configuration.

Hereinafter, the configuration will be described.

An upper portion side of an image forming apparatus body 1a is equipped with a scanner unit 130 having a CCD 131 (illustrated in FIG. 2) and an automatic document feeder (ADF) 135, whereby a document may be read as an image. Further, an operation unit 140 which is configured as a touch panel is provided at a position without a platen glass in the upper portion side of the image forming apparatus body 1a, whereby an operation and a display of information may be enabled by a user. The operation unit 140 corresponds to the operation display unit of the invention. The operation display unit of the invention may be configured such that an operation unit dedicated for an operation is separated from a display unit dedicated for a display or a display unit may have an operation function at a part thereof. As the display unit, panels of CRT, liquid crystal, EL, and the like may be exemplified. As the operation unit, a touch panel which detects a coordinate position corresponding to a button position or the like of a display panel, a mouse, a touch pen, a tablet, and the like may be exemplified.

The lower portion side of the image forming apparatus body 1a is equipped with a plurality of paper feeding trays (1-3) 160 (which are provided as three stages in the drawing), and the image forming apparatus body 1a is further equipped with a large-capacity paper feeding tray 161. A conveying path which conveys a paper fed from the paper feeding tray is provided inside the image forming apparatus body 1a, and an image forming unit which includes a LD unit 152, a photo conductor 153, a charger 154, a developer 155, a transfer unit 156, a fixing unit 157, and the like is provided in the course of the conveying path, thereby forming an image on a paper based on image data obtained from the scanner unit 130 and the set image forming condition. A printer unit 150 includes the paper feeding tray, the image forming unit, the conveying path, and the like.

The charger 154, the developer 155, the transfer unit 156, and the like are arranged around the photo conductor 153. The charger 154 evenly charges the surface of the photo conductor 153 before the image recording operation. The LD unit 152 forms an electrostatic latent image on the photo conductor 153 by irradiating a semiconductor laser to the photo conductor 153 of which the surface is evenly charged. The developer 155 develops the electrostatic latent image, formed on the photo conductor 153 by the LD unit 152, through a toner member. A toner image is formed on the photo conductor 153 by a developing process. The transfer unit 156 transfers the toner image of the photo conductor 153 onto the paper which is conveyed from the paper feeding tray (1-3) 160 or the large-capacity paper feeding tray 161. The paper onto which the toner image is transferred is separated from the photo conductor 153, and is conveyed to the fixing unit 157. The toner member which remains on the photo conductor 153 is removed by a cleaning unit.

The fixing unit 157 fixes the toner image transferred onto the surface of the paper by heating the conveyed paper. The paper subjected to the fixing process is directly conveyed to a post-processing device (FNS) 180 in the case of single-side printing. The post-processing device (FNS) 180 performs stapling, punching, trimming, and the like. On the other hand, in the case of double-side printing, the paper having an image fixed thereto is switched back and a predetermined image is transferred onto the rear surface of the paper by the printer unit 150. Then, the paper having an image formed on both sides is conveyed to the post-processing device (FNS) 180 after the image is fixed thereto.

The image forming apparatus 1 which includes the large-capacity paper feeding tray 161 and the post-processing device (FNS) 180 has been described, but as the invention, these constituents may not be provided in the image forming apparatus.

Figure 2:
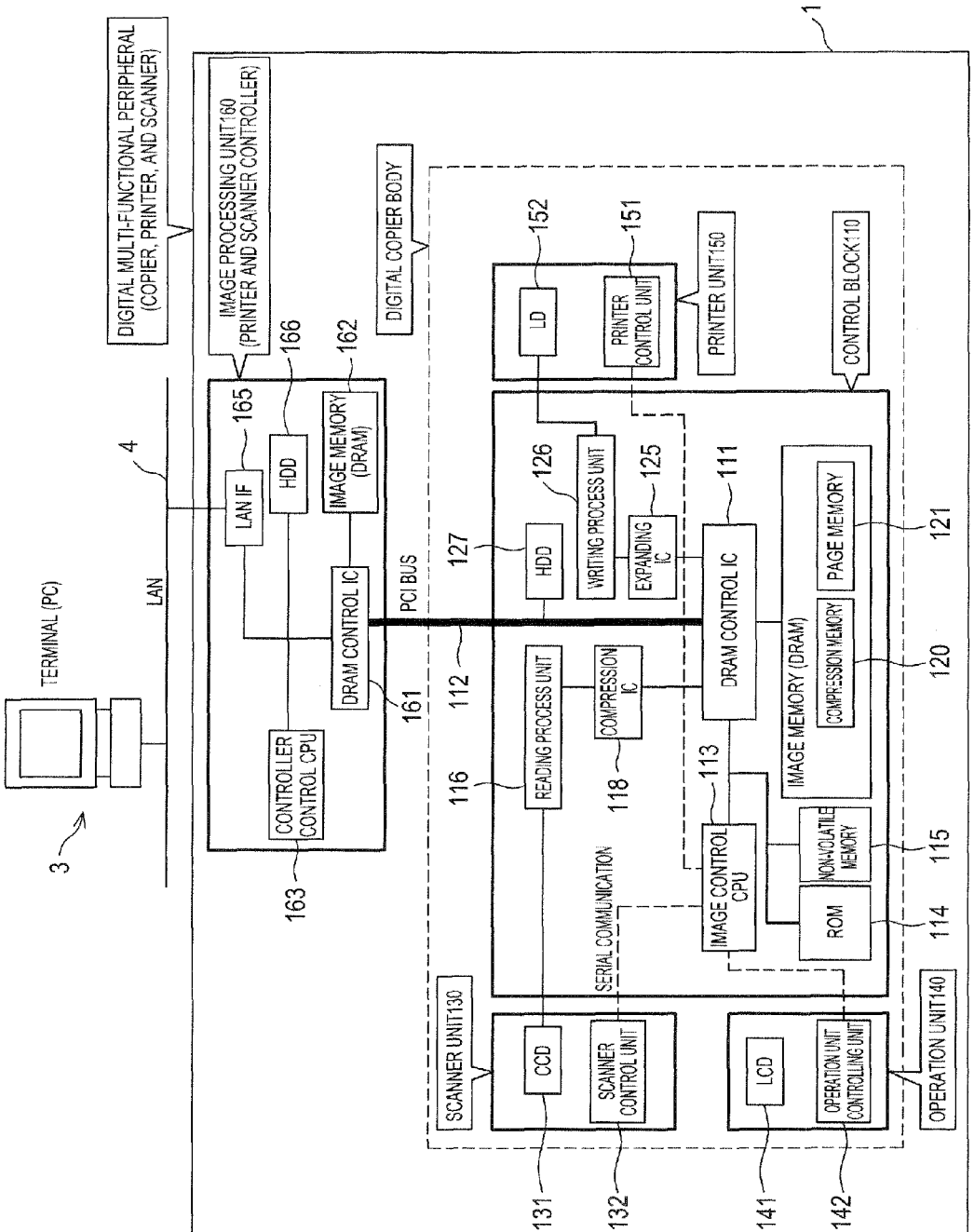
FIG. 2 is a diagram illustrating a block configuration example of the image forming apparatus.

FIG. 2 is a diagram illustrating a circuit block of the image forming apparatus 1 serving as a digital multi-functional peripheral (a copier, a printer, and a scanner), and the content will be described hereinafter in detail.

The image forming apparatus 1 includes a digital copier body which includes a control block 110, the scanner unit 130, the operation unit 140, and the printer unit 150 and an image processing unit (a printer and scanner controller) 160 which processes image data input from an external device such as a terminal (PC) 3 via a LAN 4 or transmits image data obtained by the scanner unit 130 to the external device such as the terminal (PC) 3 via the LAN 4.

The control block 110 is equipped with a PCI bus 112 which is connected to the image processing unit (the printer and scanner controller) 160, and a DRAM control IC 111 is connected to the PCI bus 112. An image memory which includes a compression memory 120 and a page memory 121 is connected to the DRAM control IC 111. The compression memory 120 is a memory which stores compressed image data of a job schedule screen, a document, or the like, and the page memory 121 is a memory which temporarily stores non-compressed image data of a print subject before the image forming operation.

Further, a HDD 127 which is connected to the PCI bus 112 stores a job and the like generated by the terminal (PC) 3 and the like connected to the image forming apparatus 1 or the image processing unit (the printer and scanner controller)

160. The HDD 127 may store a plurality of jobs. Each job includes information on the entire job, information of each page, and image data.

Further, the control block 110 includes an image control CPU 113, and the DRAM control IC 111 is connected to the image control CPU 113.

Further, a ROM 114 and a non-volatile memory 115 are connected to the image control CPU 113. The non-volatile memory 115 stores initial print setting information of the image forming apparatus 1, machine setting information such as a process control parameter, a user setting value, setting data of paper information of each paper feeding tray (a paper size, a paper type, and the like), reserved job management information, and the like in a readable and writable manner, and the ROM 114 stores a program and the like for operating the image control CPU 113 in a readable manner.

The image control CPU 113 may read and write non-volatile data of the ROM 114 or the non-volatile memory 115, and may write desired data as non-volatile data in the non-volatile memory 115. The image control CPU 113 controls the operations of the respective constituents of the image forming apparatus 1 in accordance with the machine setting information, the print setting information, the JOB management information, and the like.

The image control CPU 113 controls the entire image forming apparatus 1, and constitutes the control unit of the embodiment along with the ROM 114, the non-volatile memory 115, and the like. Further, the image control CPU 113 performs a management control of a reservation, an execution, and the like of the JOB stored in the HDD 127 or the compression memory 120.

The ROM 114, the non-volatile memory 115, the HDD 127, the RAM (not illustrated), and the like correspond to the storage unit, and the storage unit stores data relating to the JOB as described above.

The scanner unit 130 includes the CCD 131 which optically reads a document and a scanner control unit 132 which controls the entire scanner unit 130. The scanner control unit 132 is connected to the image control CPU 113 so as to enable a serial communication therebetween. Further, the CCD 131 is connected to a reading process unit 116 which processes image data read out by the CCD 131, a compression IC 118 which compresses image data is connected to the reading process unit 116, and the DRAM control IC 111 is connected to the compression IC 118.

The operation unit 140 serves as the display unit and the operation unit, corresponds to the display operation unit of the embodiment, and includes an LCD 141 which is configured as a touch panel and an operation unit controlling unit 142 which controls the entire operation unit. The operation unit controlling unit 142 is connected to the image control CPU 113 so as to enable a serial communication therebetween. The operation unit 140 is controlled by the image control CPU 113, and is configured to set an input and an output of a machine setting such as a print setting or an operation control condition of the image forming apparatus 1, a setting of paper information of each paper feeding tray (a paper size and a paper type), and an output mode (for example, a normal copy mode and a checking copy mode) by the LCD 141. Further, the operation unit 140 is configured to display a setting content and display desired information such as a list of a reserved JOB. In the display of the list of the reserved JOB, a displayed JOB may be selected and may be edited or deleted.

Further, an expanding IC 125 which expands compressed image data is connected to the DRAM control IC 111, and a writing process unit 126 is connected to the expanding IC 125. The writing process unit 126 is connected to the LD unit 152 (the laser diode) of the printer unit 150, and processes writing data used for the operation of the LD unit 152. Further, the printer unit 150 includes a printer control unit 151 which controls the entire operation (a paper feeding operation, an image forming operation, a paper discharging operation, a post-processing operation, and the like) of the printer unit 150, and the printer control unit 151 is connected to the image control CPU 113. The printer control unit 151 controls the printer unit 150 while being operated in accordance with the control instruction of the image control CPU 113.

Further, a DRAM control IC 111 of the image processing unit (the printer and scanner controller) 160 is connected to the PCI bus 112 to which the DRAM control IC 111 is connected. The image processing unit (the printer and scanner controller) 160 is used to receive image data and the like at the image forming apparatus 1 from the terminal (PC) 3 and the like connected to the LAN 4 or to transmit image data acquired by the scanner unit 130 to the terminal (PC) 3 and the like connected to the LAN 4 when the image forming apparatus 1 is used as a network printer or a network scanner. In the image processing unit (the printer and scanner controller) 160, an image memory 162 including DRAM and the like is connected to the DRAM control IC 161. Further, in the image processing unit (the printer and scanner controller) 160, the DRAM control IC 161, a controller control CPU 163 controlling the entire image processing unit (the printer and scanner controller) 160, a LAN interface 165, and a HDD 166 are connected to a common bus. The LAN interface 165 is connected to the LAN 4.

Next, a basic operation of the image forming apparatus 1 will be described.

First, a procedure of storing image data in the image forming apparatus 1 will be described.

A case will be described in which an image is read out by the scanner unit 130 and image data is generated in the first image forming apparatus 1. The scanner unit 130 optically reads an image from a document through the CCD 131. At this time, the operation of the CCD 131 is controlled by the scanner control unit 132 which receives an instruction from the image control CPU 113. The document may be read out by the automatic document feeder (ADF) 135, and may be read out while being placed on the platen glass.

The image control CPU 113 is operated by a program, and generates an instruction to the scanner unit 130 based on the operation by the operation unit 140. The image which is read out by the CCD 131 is subjected to a data process by the reading process unit 116. The image data subjected to the data process is compressed in accordance with a predetermined method in the compression IC 118, and is stored in the compression memory 120 through the DRAM control IC 111. Further, when the HDD 127 is used, the image data which is stored in the compression memory 120 through the DRAM control IC 111 is stored in the HDD 127.

The other image data is input to the image forming apparatus 1 via the LAN 4. As the image data, for example, image data which is generated by an application program and the like of the terminal (PC) 3 and the like and image data which is generated by the other image forming apparatus may be exemplified. The data is received by the image processing unit (the printer and scanner controller) 160 via the LAN 4 and the LAN interface 165, and is first stored in the image memory 162 or the HDD 166 by the DRAM control IC 161. The data of the image memory 162 or the HDD 166 is sent to the DRAM control IC 111 via the PCI bus 112, and is first stored in the page memory 121. The data which is stored in the page memory 121 is sequentially sent to the compression IC 118 through the DRAM control IC 111 so as to be compressed therein, and is stored in the compression memory 120 through the DRAM control IC 111. When storing the data in the HDD 127, the data which is stored in the compression memory 120 through the DRAM control IC 111 is stored in the HDD 127.

A reserved JOB may be set by storing image data in the compression memory 120 or the HDD 127 and setting an output condition and the like by the operation unit 140. A plurality of reserved JOBs are managed by the image control CPU 113, and the JOB management information is stored in the storage unit such as the non-volatile memory 115. The JOB management information includes an output reservation order.

When outputting an image by the image forming apparatus 1, the image data which is stored in the compression memory 120 is transmitted to the expanding IC 125 through the DRAM control IC 111 and the data is expanded based on the JOB management information. When outputting the image data stored in the HDD 127, the image data is first stored in the compression memory 120 through the DRAM control IC 111, and is sent to the expanding IC 125 through the DRAM control IC 111 so as to be expanded therein.

The expanded data is sent to the writing process unit 126 through the DRAM control IC 111, and the writing data is generated and is written in the photo conductor 153 by the LD unit 152. Further, in the printer unit 150, the respective constituents such as the paper feeding tray (1-3) 160, the large-capacity paper feeding tray 161, and the conveying path are controlled by the printer control unit 151 which receives an instruction of the image control CPU 113. In the printer unit 150, an image forming process, an image transferring process onto the paper, an image fixing process, a paper conveying process of conveying a paper to the post-processing device (FNS) 180 by the conveying path, and a post-process in the post-processing device (FNS) 180 are sequentially performed, so that a printed paper is output.

The image control CPU 113 may display a JOB list in an output reservation order on the operation unit 140 based on the JOB management information which is being managed.

Figure 3:
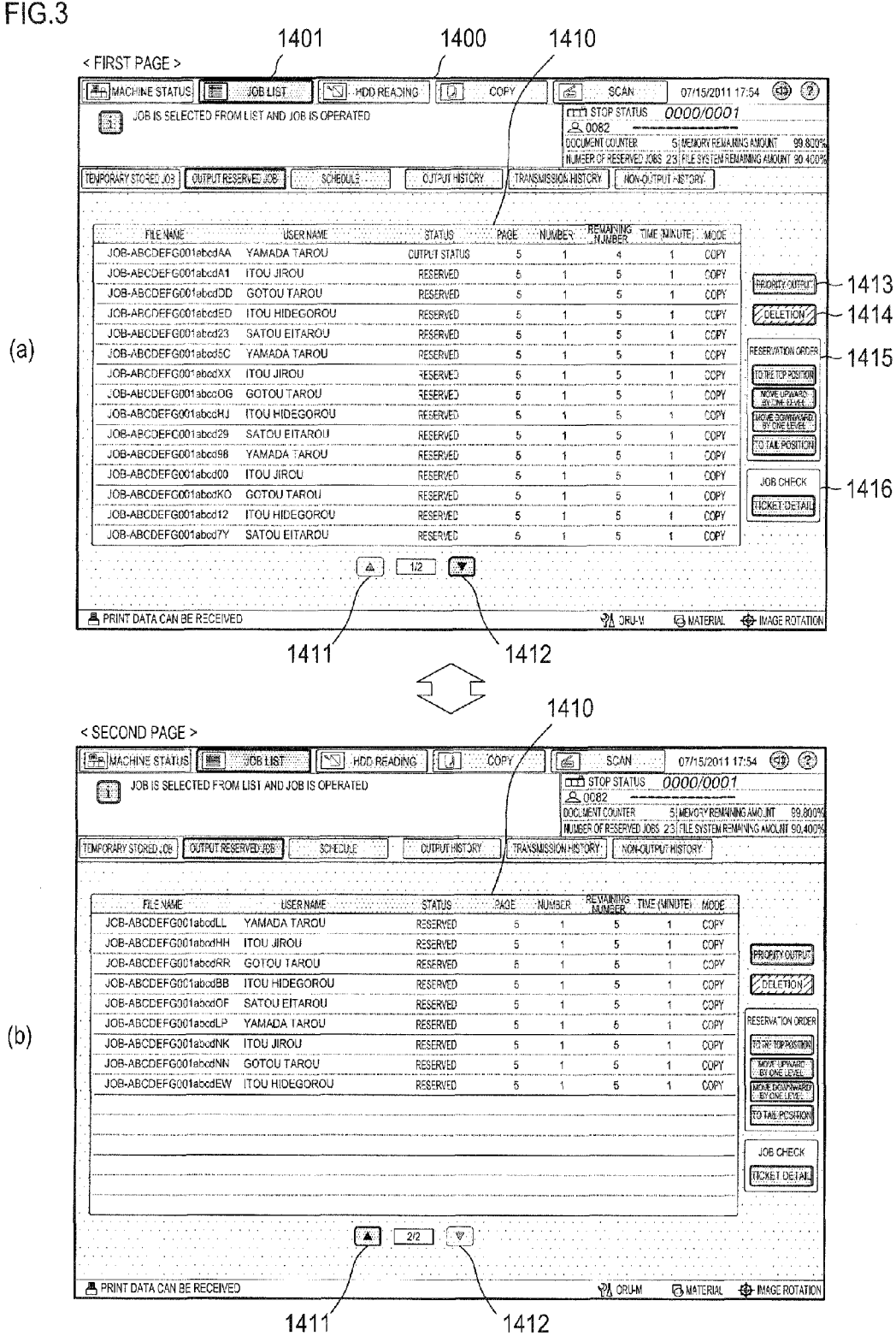
FIG. 3 are diagrams illustrating a JOB list screen in which a list of reservation JOBs is displayed in two pages in the related art.

FIGS. 3(a) and 3(b) illustrate a JOB list screen 1410 displayed on the operation unit 140. The JOB list screen 1410 is displayed by instructing a JOB list tab 1401 in the operation screen 1400.

In the screen, a file name, a status, and the like of each JOB are displayed as one line, and up to a predetermined number (in this example, 15) of JOBs can be displayed on one screen due to the relation between the size of the display character and the screen. The JOB which is being output is positioned at the top position of the list, and is displayed at the uppermost position of the JOB list screen 1410.

Figure 9:
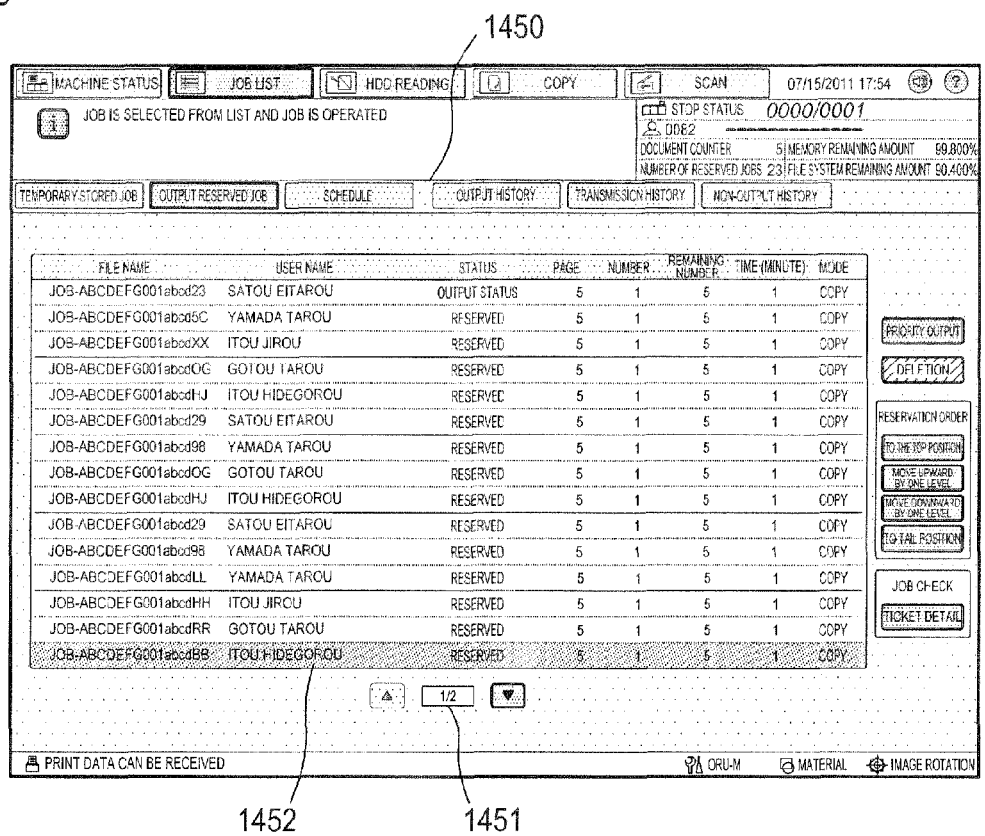
FIG. 9 is a diagram illustrating a JOB list screen according to still another embodiment in which a display position of a selected JOB is changed when updating the display of the list and a page is switched according to the change of the display position.

In the JOB list screen 1410, all JOBs may not be displayed on one screen when a predetermined number or more (in this example, 24) of reserved JOBs are present. For this reason, 15 JOBs are displayed at the first page as illustrated in FIG. 3(a), and 9 JOBs are displayed at the second page as illustrated in FIG. 3(b).

Further, in the JOB list screen 1410, a page-up button 1411 and a page-down button 1412 are displayed as buttons to be able to press, where it is possible to switch to the JOB list screen of the previous page by the page-up button 1411 and to switch to the JOB list screen of the next page by the page-down button 1412. In FIG. 3(a), since the JOB list of the first page is displayed on the screen, the page-up button 1411 can not be operated.

When the page-down button 1412 is pressed in the JOB list screen 1410 of FIG. 3(a), it is possible to switch to the JOB list screen 1410 on which the JOB list of the second page is displayed as illustrated in FIG. 3(b). In this example, since all JOBs are displayed at the second page, a third page does not exist, so that the page-down button 1412 can not be operated in the JOB list screen 1410 of FIG. 3(b). When the number of the reserved JOBs further increases, the third page and the next pages may be displayed. When the page-up button 1411 is pressed in the JOB list screen 1410 of FIG. 3(b), it is possible to switch to the JOB list screen 1410 of the first page illustrated in FIG. 3(a).

Further, in the JOB list screen 1410, the JOB may be selected by the instructing operation of the user, and the corresponding JOB may be selected by pressing the display line of the JOB. The selected JOB is designated by a predetermined operation. For this reason, the JOB list screen 1410 displays a priority output button 1413, a delete button 1414, an order change button group 1415 having a plurality of buttons for changing the order of the JOBs, and a ticket detail button 1416 for checking the JOB content in a pressable manner with respect to the selected JOB.

In the JOB list, a JOB is added to the tail position by a new reservation, the JOB at the top position is deleted when the output is completed, and the subsequent JOB is moved to the upper position when the JOB is deleted. When the status of the JOB is changed, the image control CPU 113 updates the display of the JOB list. For this reason, when the output of the JOB at the top position is completed, the JOB is displayed at the position higher by one line. When displaying the second page and the next page, the JOB at the top position is raised to the previous page, so that the JOB cannot be seen from the screen. Further, when the second page exists, the JOB at the top position of the second page is raised to the tail position of the first page, and is newly displayed.

As described above, the display of the list is updated in response to a reservation of a new JOB, completion of an output, and deletion of a JOB as a change in the status of the JOB.

Figure 4:
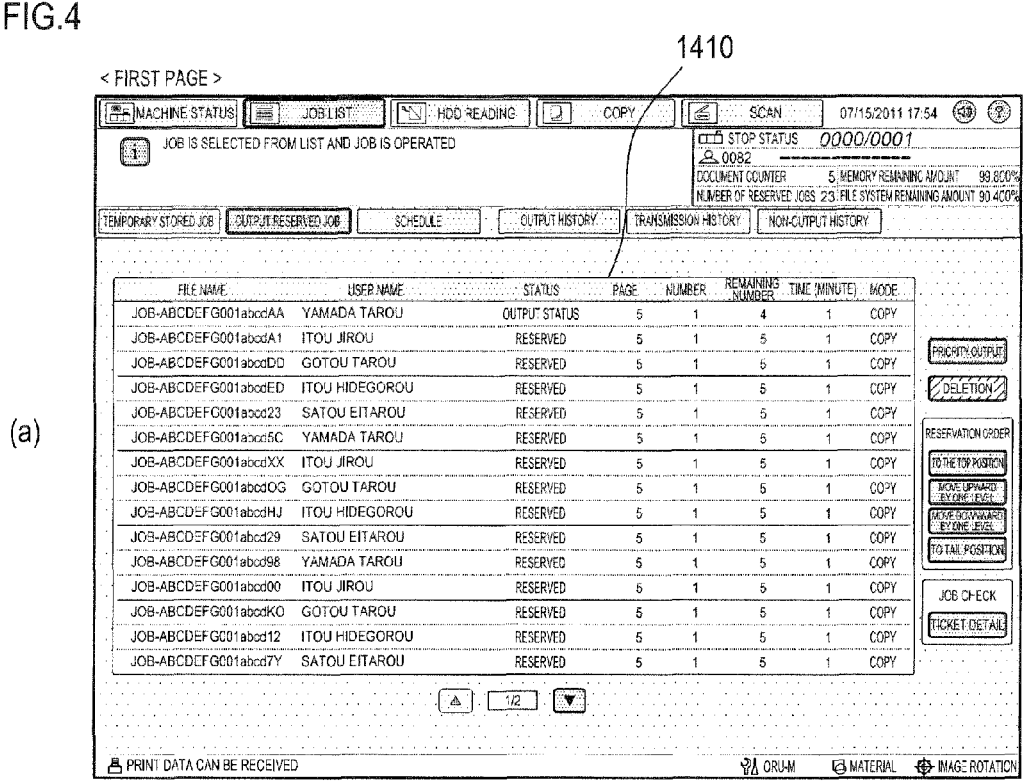
FIG. 4 are diagrams illustrating a JOB list screen in which a list of reservation JOBs is displayed in two pages and a JOB is selected in the second page in the related art.
Figure 4:
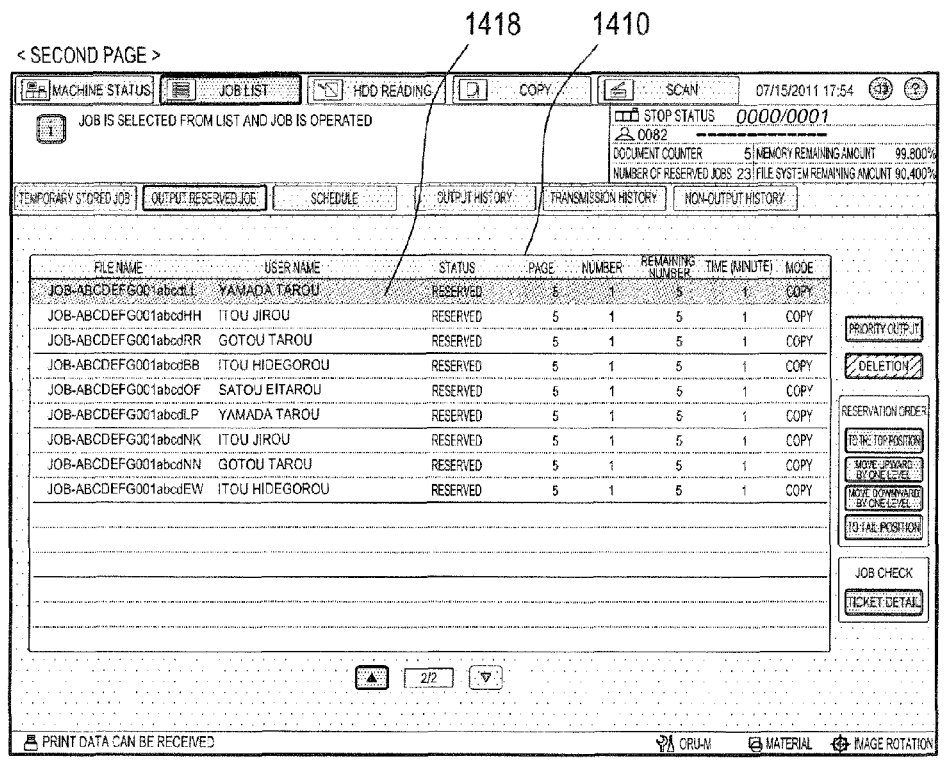

FIGS. 4(a) and 4(b) illustrate the JOB list screen 1410 in which the JOB positioned at the top position of the JOB list of the second page is selected by the instructing operation of the user and a JOB display line 1418 is highlighted.

Since the JOB is selected while the JOB is displayed, the JOB is selected from the display list of FIG. 4(b). As for the selected JOB, the above-described instructing operation may be performed by pressing the delete button 1414 and the like.

Figure 5:
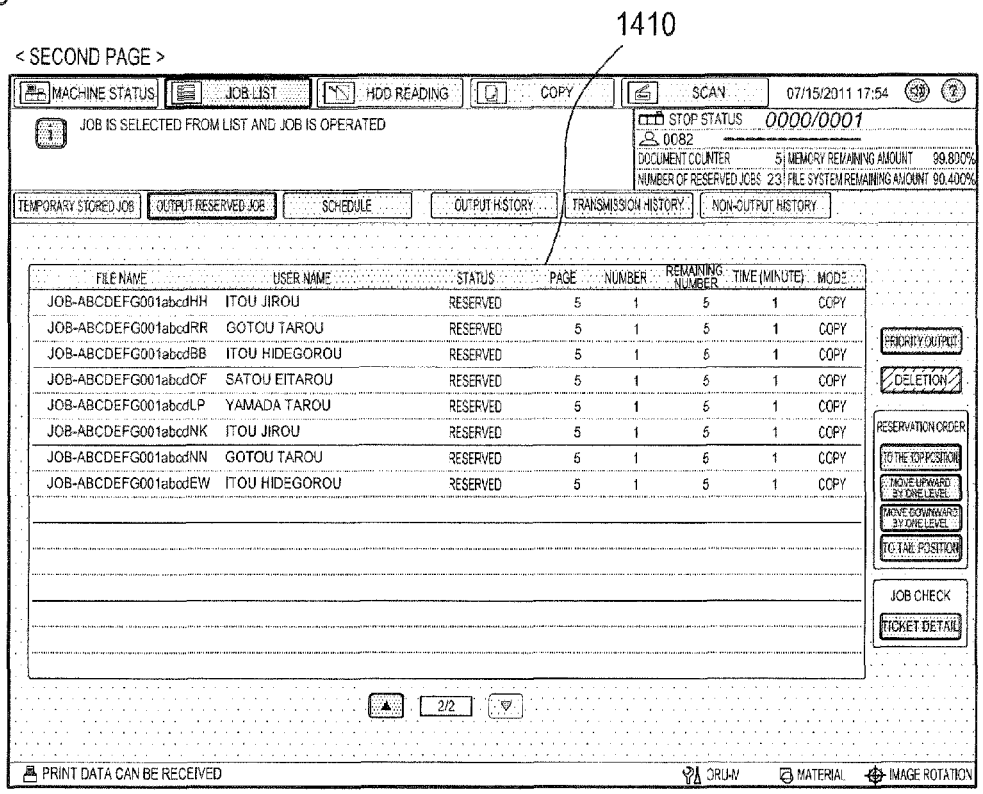
FIG. 5 is a diagram illustrating the JOB list screen of the second page in which the selected JOB is invisible by the update of the display of the JOB list in the related art.

Incidentally, when the JOB at the top position of the JOB list is output and the output thereof is completed, the display is updated as described above in the related art. Then, as illustrated in FIG. 5, the selected JOB at the top position of the display list of the second page is raised to the first page, so that the selected JOB disappears from the display list.

Figure 6:
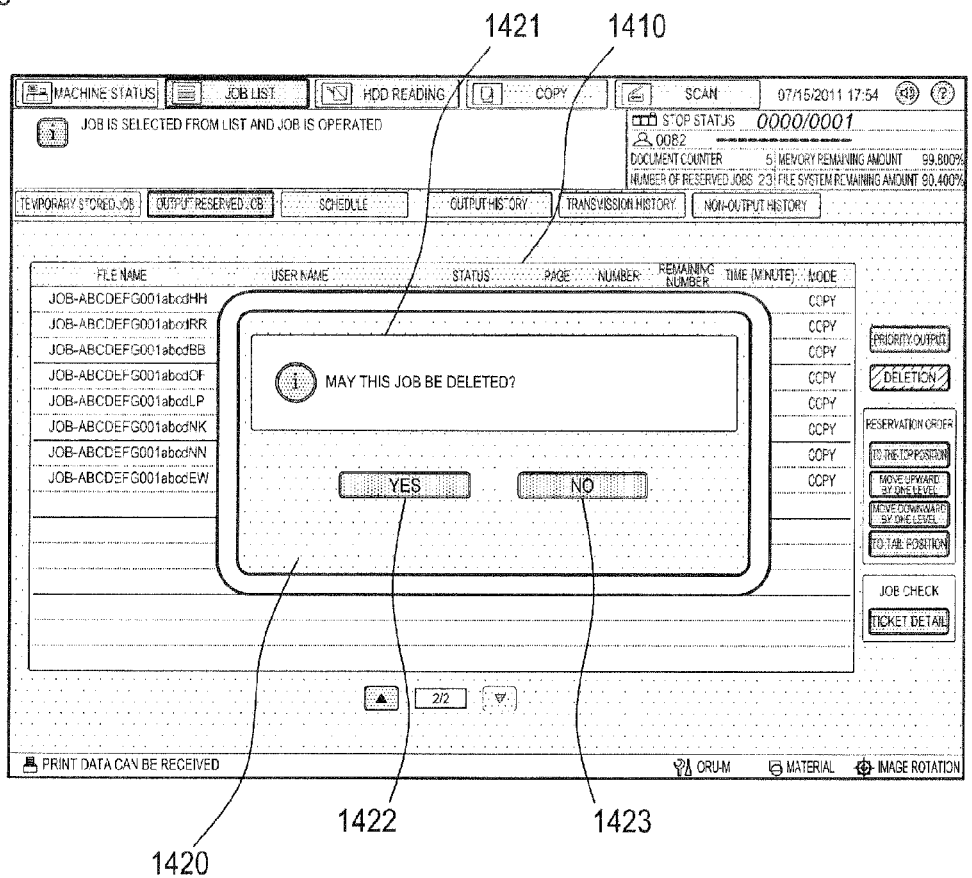
FIG. 6 is a diagram illustrating a checking pop-up screen displayed on the JOB list screen in the second page in which the selected JOB is invisible in the related art.

Further, FIG. 6 illustrates an example of the related art in which a checking pop-up screen 1420 is displayed on the JOB list screen 1410 of the second page when instructing the selected JOB. The pop-up screen 1420 is provided with an operation content checking display box 1421, and a "Yes" button 1422 and a "No" button 1423 for checking are displayed therein in a pressable manner. The operator may select "Yes" or "No" after checking the display of the pop-up screen 1420. However, when the display of the selected JOB disappears from the screen as described above, the JOB may not be checked, and it is difficult to determine whether the selection of the JOB is correct.

Furthermore, in the description above, an example of switching the screen has been described, but the screen may be scrolled.

Figure 7:
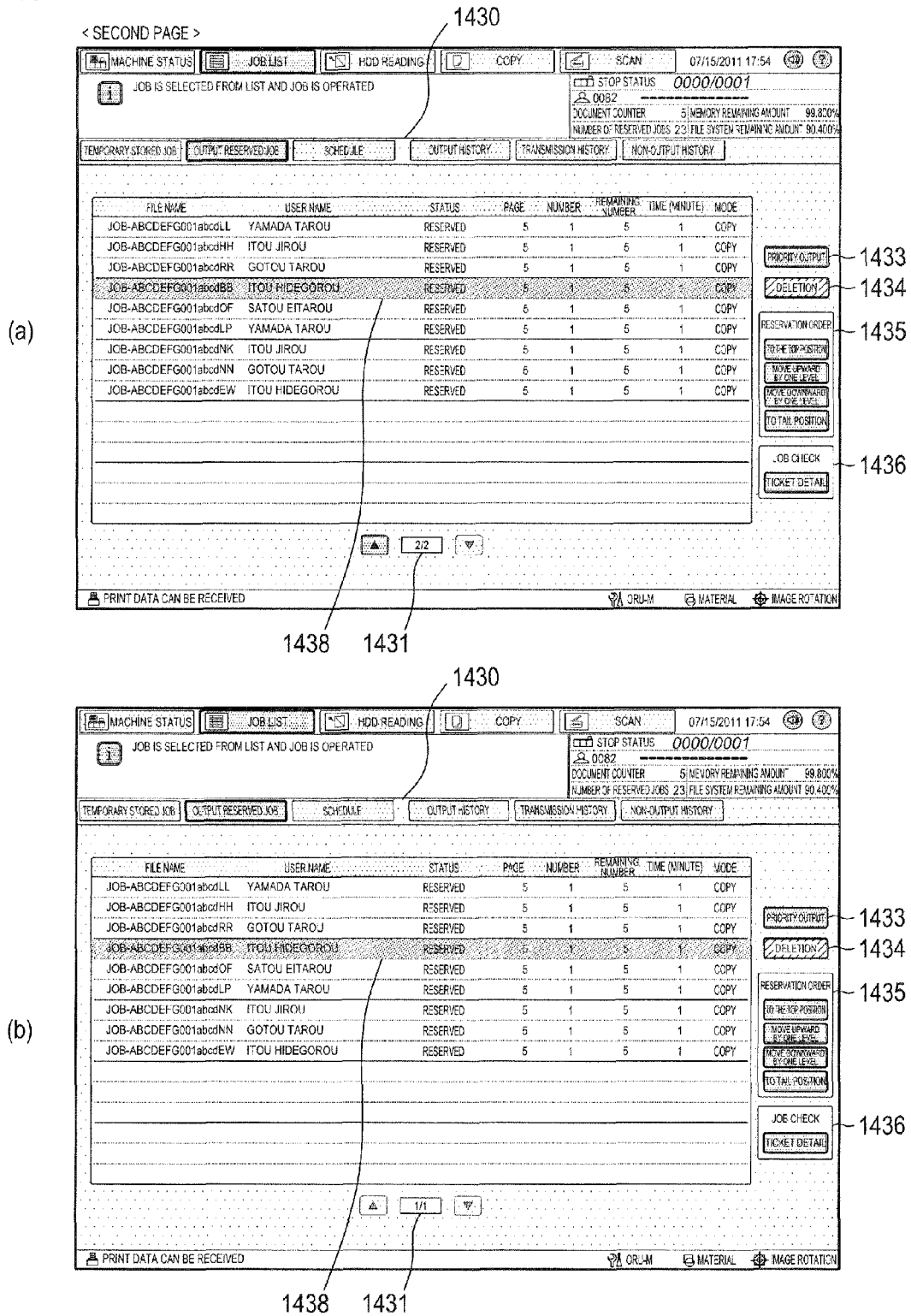
FIG. 7 are diagrams illustrating a JOB list screen according to an embodiment of the invention in which a display position in a display list with a selected JOB is not changed when updating the display of the list.

FIGS. 7(a) and 7(b) illustrate a JOB list screen 1430 which is displayed according to the control of the invention. In the JOB list screen 1430 of FIG. 7(*a*), the second page of two pages is displayed as illustrated in a page display box 1431. Even in the JOB list screen 1430, the JOB may be selected by the instructing operation of the user, and a button for performing a predetermined instructing operation with respect to the selected JOB is displayed. Specifically, a priority output button 1433, a delete button 1434, an order change button group 1435 having a plurality of buttons for changing the order of the JOB, and a ticket detail button 1436 for checking the content of the JOB are displayed in a pressable manner with respect to the selected JOB.

When the JOB is selected, a JOB display line 1438 is highlighted. In this example, the delete button 1434 with respect to the selected JOB is pressed.

When the output of the JOB at the top position of the JOB list is completed while the JOB is selected, the output JOB is deleted from the JOB list, and the display is updated so that the JOBs in the JOB list screen are sequentially raised. Here, in the embodiment, the JOB is not raised in the display list which displays the selected JOB, and the JOB is raised with the completion of the output of the JOB in the JOB list at the previous page. That is, in the display list with the selected JOB, the JOB is not raised while the selected JOB is displayed.

In the embodiment, when updating the display of the list of the JOBs, the display list with the selected JOB is directly displayed regardless of the output of the JOB, and hence the selected JOB may be reliably checked.

According to the above-described configuration, in a case where the display of the list is updated due to a change in the status of the JOB, the selected JOB may be displayed on the screen even when the page is switched or scrolled.

Furthermore, when the JOBs for one page are deleted as the JOBs are raised, a blank for one page is generated, so that the page information is raised in the page with the selected JOB and the next pages.

FIG. 7(*b*) illustrates the JOB list screen 1430 in which the page information is rewritten by raising the selected JOB from the page where the JOB is displayed. The display content of the JOB list of the display screen is not changed, but the page display box 1431 may be rewritten from "2/2" to "1/1".

In the embodiment, when updating the display of the list of the JOBs, the display list with the selected JOB is displayed without any change until the output of the JOBs for one page is completed regardless of the output of the JOB, and is displayed without any change even when the page is switched later. Accordingly, it is possible to reliably check the selected JOB even during a time when a plurality of JOBs are sequentially output.

According to the above-described configuration, when the output of the number of JOBs for one page is completed while the display page with the selected JOB remains without any change, the page number is changed and the display list is displayed without any change. Accordingly, it is possible to easily check the selected JOB while the continuity of the list is maintained.

Furthermore, in the respective embodiments of FIGS. 7(*a*) and 7(*b*), the JOB is not raised in the display list with the selected JOB, but as the invention, the selected JOB in the display list may be raised with the completion of the output of the JOB at the top position.

Figure 8:
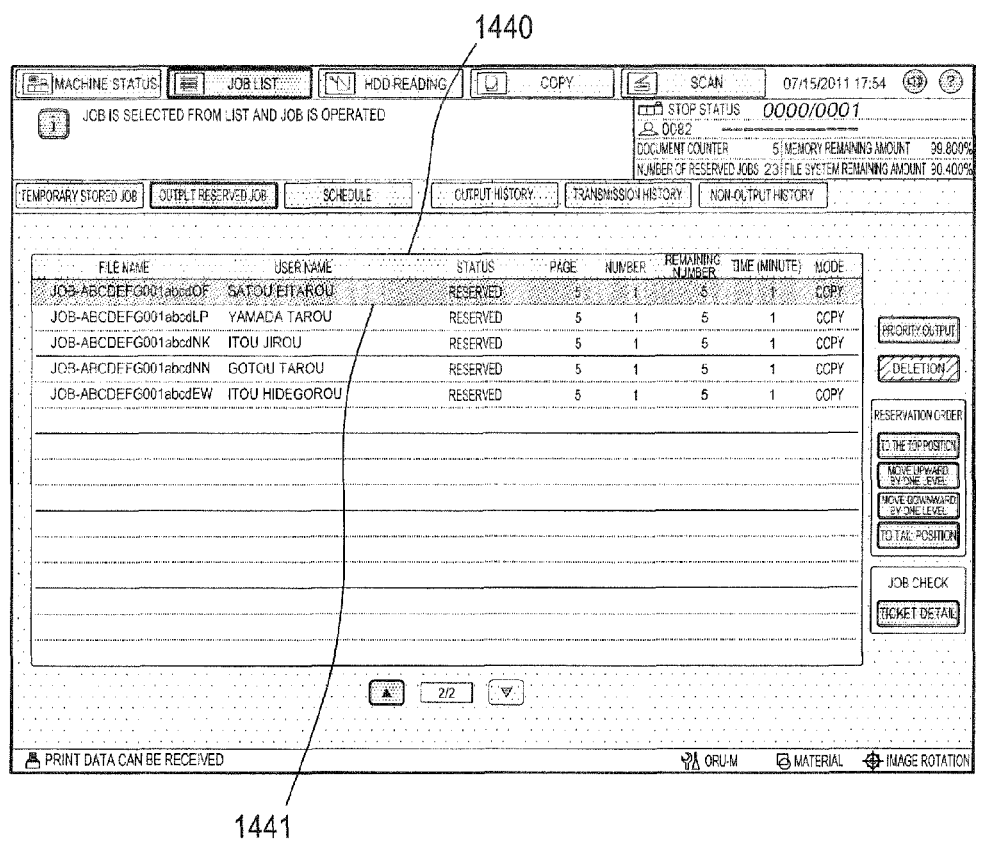
FIG. 8 is a diagram illustrating a JOB list screen according to another embodiment in which a display position of a selected JOB is changed to a top position of a display list when updating the display of the list.

FIG. 8 illustrates a JOB list screen 1440 in which the JOB is selected in the JOB list screen illustrated in, for example, FIG. 7(*a*), the top JOBs are sequentially output, and the selected JOB reaches a top JOB display line 1441 in the display list with the selected JOB.

In the embodiment, when the output of the top JOB which is selected is further completed, the selected JOB is prohibited from being raised and remains in the display screen. Accordingly, JOBs before the selected JOB are raised and displayed with the completion of the output of the JOB.

According to the above-described configuration, in the display screen with the selected JOB, the display is updated so that the JOB is raised until the selected JOB reaches the top position of the display list with the completion of the output. Accordingly, it is possible to check a change in the status of the JOB and to easily check the selected JOB.

Further, when the selected JOB is raised so as to reach the top position of the display screen and the JOB is further output, the selected JOB may be raised and the display page may be switched to the previous page.

A JOB list screen 1450 of FIG. 9 illustrates a state where the selected JOB positioned at the top position of the display list is positioned at a JOB display line 1452 at the tail position of the list of the previous page by raising the JOB and the screen is switched to the previous page with the raising of the JOB. For this reason, a page display box 1451 shows "1/2" so as to indicate a state where the page is switched from the second page to the first page.

According to the above-described configuration, when displaying the JOB list so that the JOB is raised in the list with the completion of the output, the display page is switched with the movement in page of the selected JOB. Accordingly, the selected JOB is displayed on the screen all the time, so that the selected JOB may be easily checked.

Further, in a case where a pop-up screen is displayed in response to the operation of instructing the selected JOB, even when the selected JOB is held in the display screen, there is a case in which the selected JOB may not be checked if the pop-up screen is displayed on the JOB list screen. In this case, when the display position of the pop-up screen is fixed, it is possible to change the display position of the selected JOB so that the JOB is not covered by the pop-up screen. In this case, the JOB list may be scrolled so that the order with respect to the other JOBs is maintained. Further, the display position of the pop-up screen may be changed so as not to cover the selected JOB. Further, the display position of the selected JOB is changed to the top position or the tail position of the list of the display screen, and the pop-up screen may be displayed so that the pop-up screen does not cover the display line of the selected JOB displayed at a changed position.

Figure 10:
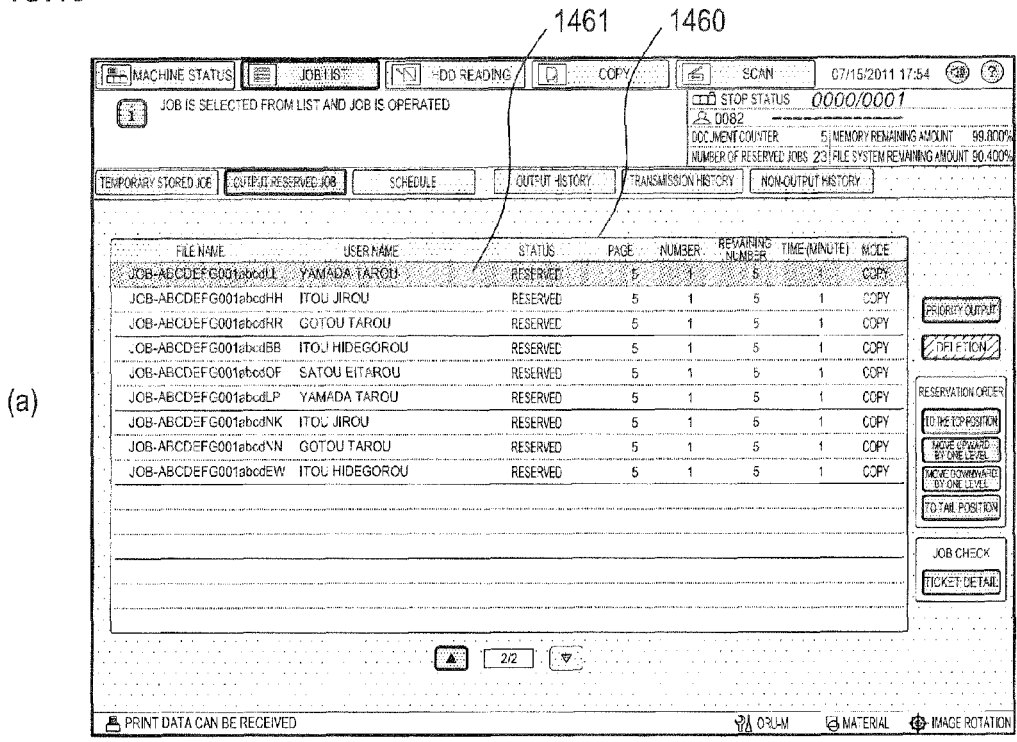
FIG. 10 is a diagram illustrating a JOB list screen according to still another embodiment in which a display position of a selected JOB is changed to a top position of a display list when updating the display of the list and a checking pop-up screen is displayed so as not to hide the selected JOB.
Figure 10:
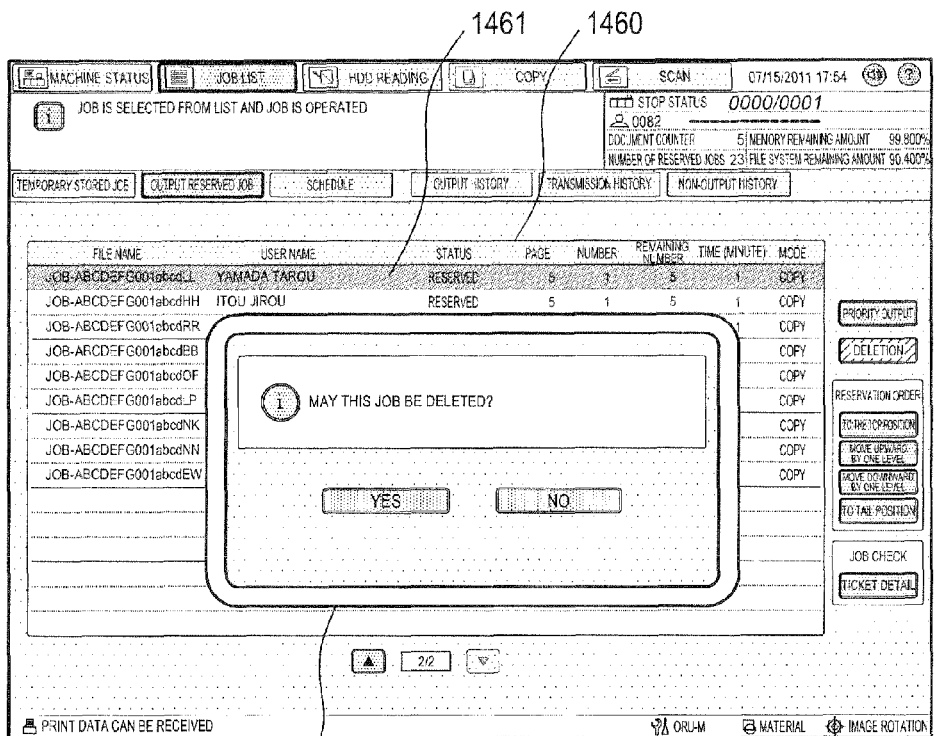

FIG. 10(*a*) illustrates a JOB list screen 1460 which is provided with the pop-up screen and changes the display so that a JOB display line 1461 for the selected JOB is positioned at the top position of the display list.

FIG. 10(*b*) illustrates a state where the JOB display line 1461 for the selected JOB is positioned at the top position of the list and a checking pop-up screen 1470 is displayed on the JOB list screen 1460. In the display list, the pop-up screen 1470 is displayed while the JOB display line 1461 is displayed, and hence the instructing operation may be checked by the pop-up screen 1470 while checking the selected JOB. Accordingly, an erroneous instructing operation may be prevented. According to the checking pop-up screen, it is possible to execute an instructing operation such as the deletion of the JOB without any mistake.

According to the above-described configuration, where there is an instructing operation with respect to the selected JOB, the pop-up screen for the instructing operation may be displayed without the interference with the display of the selected JOB, and hence the selected JOB may be easily checked while the pop-up screen is displayed.

Next, a control procedure for updating each display will be described based on the flowcharts of the accompanying drawings. Furthermore, the following control procedure is performed by the image control CPU 113.

Figure 11:
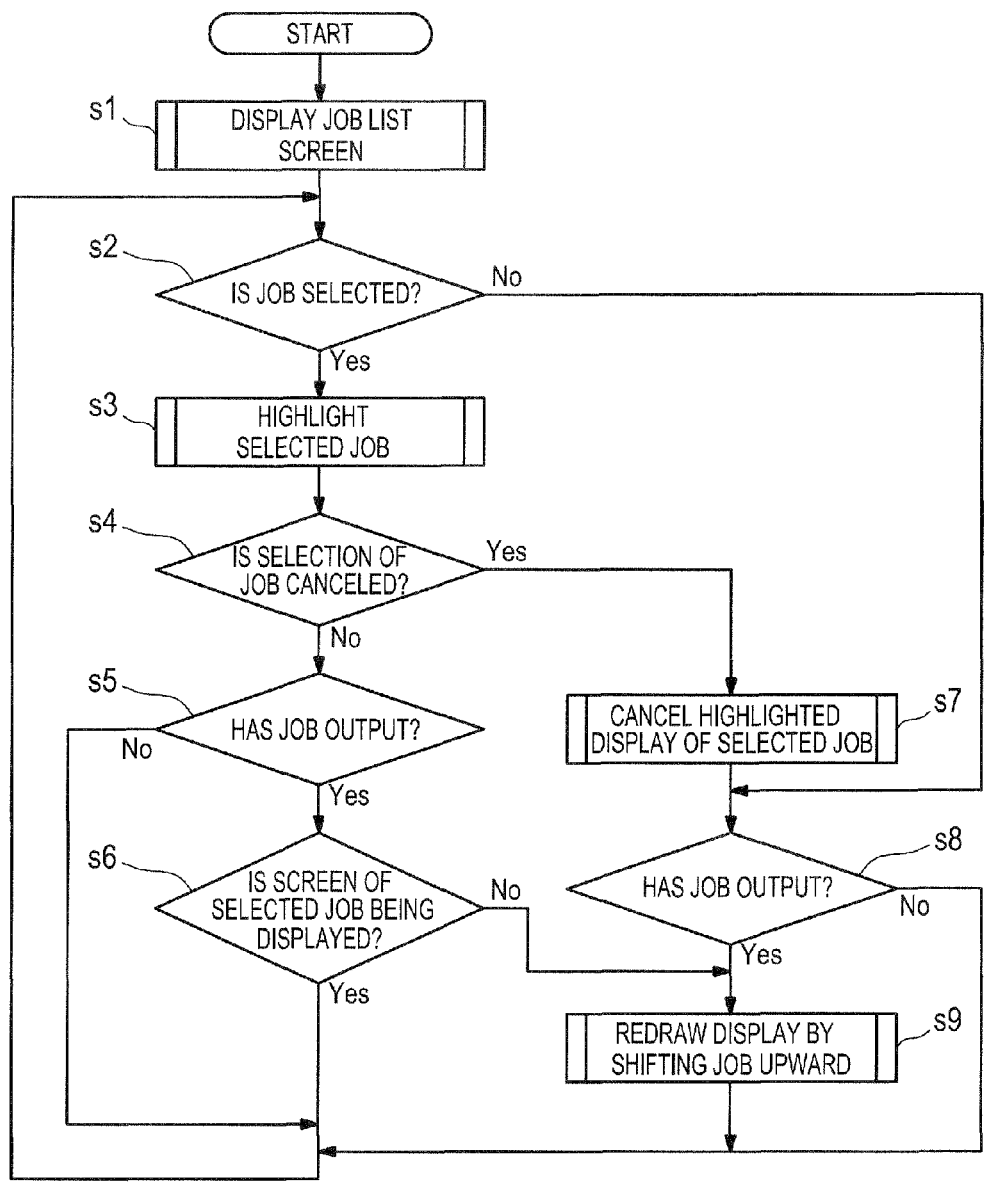
FIG. 11 is a flowchart illustrating a procedure in which a display position is not changed in a display list with a selected JOB when updating the display of the list.

The flowchart of FIG. 11 illustrates a procedure in which the display of the JOB in the display list with the selected JOB is not raised with the output of the JOB when there is the selected JOB and the JOB is raised with the output of the JOB in the display list without the selected JOB or the display list when there is no selected JOB. When there is no selected JOB, all JOBs are subjected to the same process by updating the display of the list.

This example corresponds to the display in the JOB list display screen 1430 of FIG. 7. Hereinafter, a procedure of this example will be described based on the flowchart of FIG. 11.

In accordance with the instructing operation of the operator, the JOB list screen is displayed on the operation unit 140 (step s1). Subsequently, it is determined whether the JOB is selected in the displayed list or not (step s2), and when the JOB is selected (YES in step s2), the selected JOB is highlighted (step s3). When the JOB is not selected (NO in step s2), it is determined whether the JOB is output or not (step s8).

After the selected JOB is highlighted (step s3), it is determined whether the selection of the JOB is canceled or not (step s4), and when the selection of the JOB is not canceled (NO in step s4), it is determined whether the JOB is output or not (step s5). When the selection of the JOB is canceled (YES in step s4), the highlighted display of the selected JOB is canceled (step s7), and it is determined whether the JOB is output or not (step s8).

When the JOB is output (YES in step s5) without canceling the selection of the JOB (NO in step s4), it is determined whether the screen with the selected JOB is displayed or not (step s6). When the selected JOB is displayed on the screen (YES in step s6), the JOB in the screen is not displayed so as to be raised, and the routine returns to step s2. When the selected JOB is not displayed on the screen (NO in step s6), the display of the JOB is raised so as to be shifted upward, and the display is redrawn, that is, the display is updated (step s9). Then, the routine returns to step s2. Even when the JOB is not output (NO in step s5), the routine returns to step s2.

After the highlighted display of the selected JOB of step s7 is canceled or when it is determined that the JOB is not selected in step s2, it is determined whether the JOB is output or not as described above (step s8). When the JOB is output (YES in step s8), the display is updated so that the JOB is raised so as to be shifted upward (step s9), and the routine returns to step s2. Then, when the JOB is not output (NO in step s8), the routine directly returns to step s2.

Figure 12:
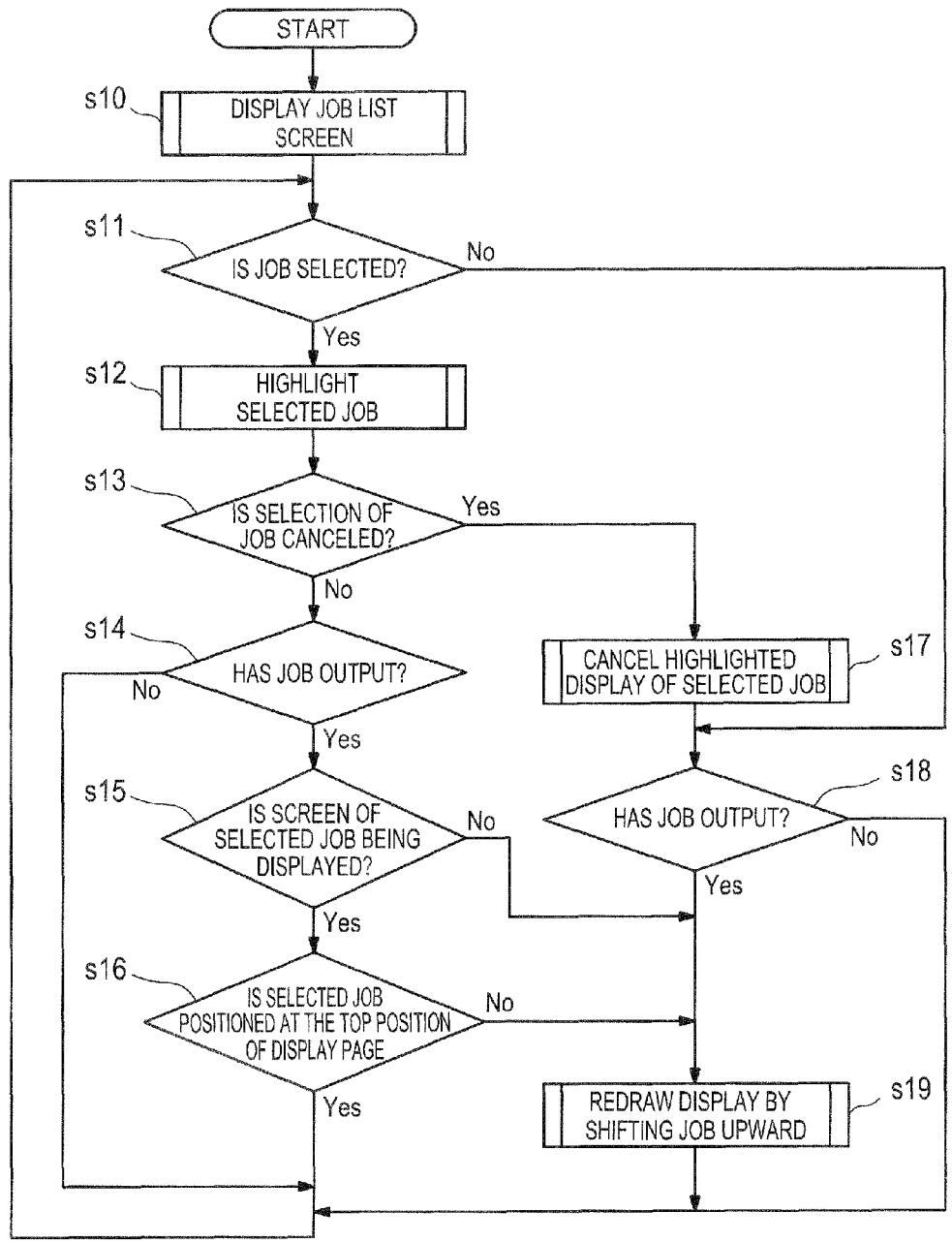
FIG. 12 is a flowchart illustrating a procedure in which a display position of a selected JOB is changed to a top position of a display list when updating the display of the list and the display position is not changed after the selected JOB is positioned at the top position.

The flowchart of FIG. 12 illustrates a procedure in which the raising display is performed until the selected JOB reaches the top position of the list of the screen with the output of the JOB when the selected JOB is displayed on the screen and the JOB is not raised in the screen when the selected JOB reaches the top position of the screen. This example corresponds to the display in the JOB list display screen 1440 of FIG. 8. Hereinafter, a procedure of this example will be described based on the flowchart of FIG. 12.

In accordance with the instructing operation of the operator, the JOB list screen is displayed on the operation unit 140 (step s10). Subsequently, it is determined whether the JOB is selected or not in the displayed list (step s11), and when the JOB is selected (YES in step s11), the selected JOB is highlighted (step s12). When the JOB is not selected (NO in step s11), it is determined whether the JOB is output or not (step s18).

After the selected JOB is highlighted (step s12), it is determined whether the selection of the JOB is canceled or not (step s13), and when the selection of the JOB is not canceled (NO in step s13), it is determined whether the JOB is output or not (step s14). When the selection of the JOB is canceled (YES in step s13), the highlighted display of the selected JOB is canceled (step s17), and it is determined whether the JOB is output or not (step s18).

When the JOB is output (YES in s14) without canceling the selection of the JOB (NO in step s13), it is determined whether the screen with the selected JOB is displayed or not (step s15). When the JOB is not output (NO in step s14), the routine returns to step s11.

When the selected JOB is displayed on the screen (YES in step s15), it is determined whether the selected JOB is positioned at the top position of the list of the display page or not (step s16). When the selected JOB is not displayed on the screen (NO in step s15), the JOB is raised so as to be shifted upward and the display is redrawn, that is, the display is updated (step s19). Then, the routine returns to step s11.

When the selected JOB is positioned at the top position of the display page as a result of the determination on whether the selected JOB is positioned at the top position of the list of the display page or not (YES in step s16), the routine returns to step s11 without raising the JOB. When the selected JOB is not positioned at the top position of the display page (NO in step s16), the JOB is raised so as to be shifted upward and the display is redrawn (step s19). Then, the routine returns to step s11.

After the highlighted display of the selected JOB of step s17 is canceled or when it is determined that the JOB is not selected in step s11, it is determined whether the JOB is output as described above or not (step s18). When the JOB is output (YES in step s18), the display is updated so that the JOB is raised so as to be shifted upward (step s19), and the routine returns to step s11. When the JOB is not output (NO in step s18), the routine directly returns to step s11.

Figure 13:
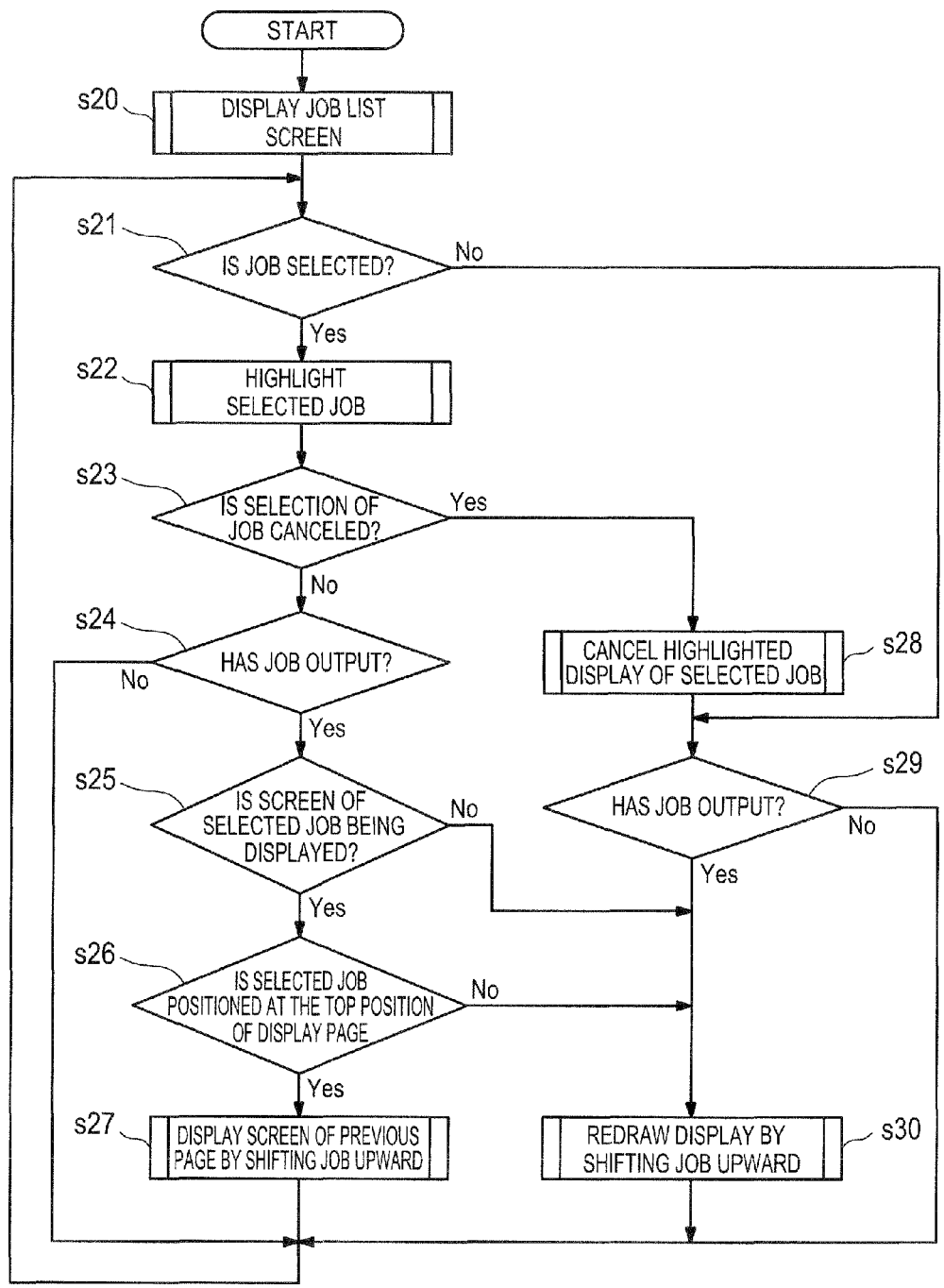
FIG. 13 is a flowchart illustrating a procedure in which a display position of a selected JOB is changed when updating the display of the list and a page is switched when switching the display position to a previous page.

The flowchart of FIG. 13 illustrates a procedure in which the raising display is performed until the selected JOB reaches the top position of the list of the screen with the output of the JOB when the selected JOB is displayed on the screen, the JOB is further raised after the selected JOB reaches the top position of the list of the screen, and the page is switched so that the selected JOB is displayed. This example corresponds to the display of the JOB list display screen 1450 of FIG. 9. Hereinafter, a procedure of this example will be described based on the flowchart of FIG. 13.

In accordance with the instructing operation of the operator, the JOB list screen is displayed on the operation unit 140 (step s20). Subsequently, it is determined whether the JOB is selected in the displayed list (step s21), and when the JOB is selected (YES in step s21), the selected JOB is highlighted (step s22). When the JOB is not selected (NO in step s21), it is determined whether the JOB is output or not (step s29).

After the selected JOB is highlighted (step s22), it is determined whether the selection of the JOB is canceled or not (step s23), and when the selection of the JOB is not canceled (NO in step s23), it is determined whether the JOB is output or not (step s24). When the selection of the JOB is canceled (YES in step s23), the highlighted display of the selected JOB is canceled (step s28), and it is determined whether the JOB is output or not (step s29).

When the JOB is output (YES in step s24) without canceling the selection of the JOB (NO in step s23), it is determined whether the screen with the selected JOB is displayed or not (step s25). When the JOB is not output (NO in step s24), the routine returns to step s21.

When the selected JOB is displayed on the screen (YES in step s25), it is determined whether the selected JOB is positioned at the top position of the list of the display page or not (step s26). When the selected JOB is not displayed on the screen (NO in step s25), the JOB is raised so as to be shifted upward and the display is redrawn, that is, the display is updated (step s30). Then, the routine returns to step s21.

When the selected JOB is positioned at the top position of the display list of the display page as a result of the determination on whether the selected JOB is positioned at the top position of the display list of the display page or not (YES in step s26), the JOB is raised so as to be shifted upward, and the display page is switched to the previous page (step s27). Then, the routine returns to step s21 while the selected JOB is displayed on the display page. When the selected JOB is not positioned at the top position of the display list of the display page (NO in step s26), the JOB is raised so as to be shifted upward and the display is redrawn (step s30). Then, the routine returns to step s21.

After the highlighted display of the selected JOB of step s28 is canceled or when it is determined that the JOB is not selected in step s21, it is determined whether the JOB is output or not as described above (step s29). When the JOB is output (YES in step s29), the display is updated so that the JOB is raised so as to be shifted upward (step s30), and the routine returns to step s21. When the JOB is not output (NO in step s29), the routine directly returns to step s21.

Figure 14:
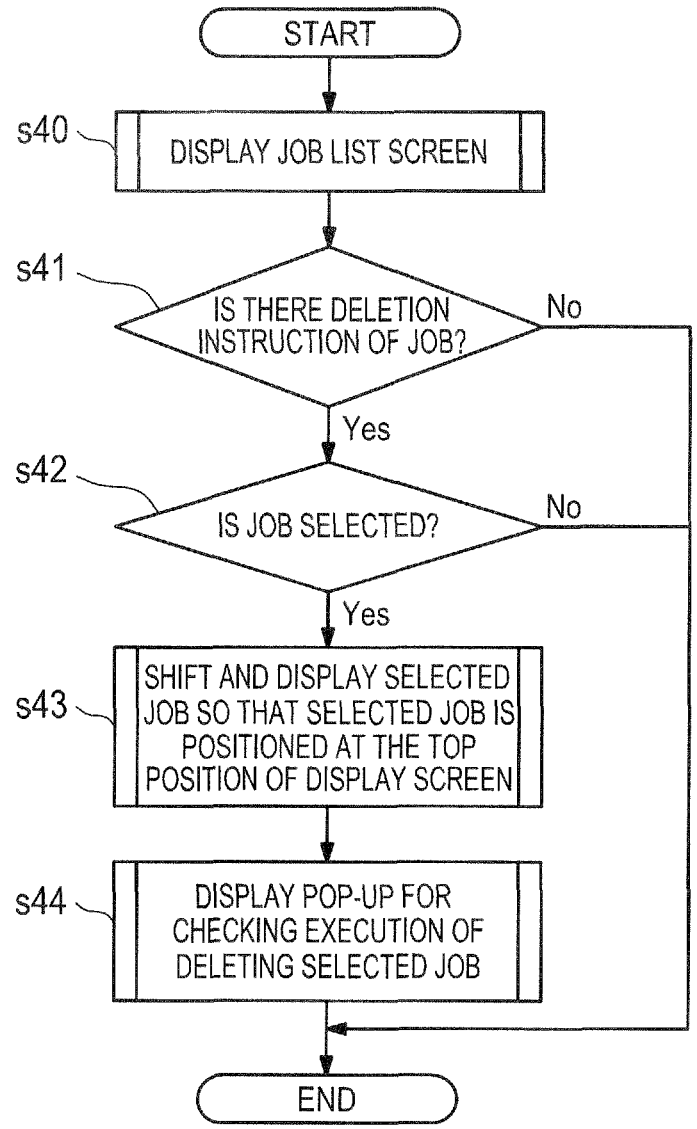
FIG. 14 is a flowchart illustrating a procedure in which a display position of a selected JOB is changed to a top position of a display list when updating the display of the list and a checking pop-up screen is displayed so as not to hide the selected JOB.

The flowchart of FIG. 14 illustrates a procedure in which the display position of the selected JOB is changed to the top position of the display list of the display page so that the selected JOB is not hidden by the pop-up screen when the pop-up screen for the selected JOB is displayed. This example corresponds to the display of the JOB list display screen 1460 in FIG. 10. Hereinafter, a procedure of this example will be described based on the flowchart of FIG. 14.

In accordance with the instructing operation of the operator, the JOB list screen is displayed on the operation unit 140 (step s40). Subsequently, it is determined whether there is an instruction for deleting the JOB or not (step s41), and when there is no instruction for deleting the JOB (NO in step s41), the process ends. When there is an instruction for deleting the JOB (YES in step s41), it is determined whether the JOB is selected or not (step s42). When the JOB is not selected (NO in step s42), the process ends. When the JOB is selected (YES in step s42), the display is updated by shifting the selected JOB to the top position of the display page (step s43). In this shift, only the selected JOB may be shifted, and the other JOBs in the display list may be also shifted together. After the checking pop-up screen to be described below is displayed and deleted, a process of returning the display of the JOB to the state before the shifting may be performed.

After the display position of the selected JOB is changed, a pop-up screen for checking the execution of the deletion of the selected JOB is displayed (step s44). The pop-up screen is not limited to the purpose of checking the deletion. After the pop-up screen is displayed, the process ends.

The above-described procedure may be executed in each procedure in which the selected JOB is maintained in the display screen.

As described above, according to the image forming apparatus of the embodiment, when there is a selected JOB in the display list of the reserved JOBs, the selected JOB may be maintained in a displayed state on the screen when the display of the list is updated with a change in the status of the JOB. Accordingly, it is possible to easily check the JOB when performing an instructing operation such as a deletion, and hence there is an advantage that an erroneous operation of deleting an unexpected JOB may be prevented.

While the invention has been described based on the respective embodiments, the invention is not limited to the content of the above-described embodiments, and the invention may be, of course, appropriately modified without departing from the spirit of the invention.

What is claimed is:

1. An image forming apparatus comprising:
an image forming unit which forms an image based on a JOB;
a display operation unit which enables display of the JOB and an input of an operation for the JOB; and
a control unit which manages the JOB and controls the image forming unit and the display operation unit,
wherein the control unit (i) arranges a predetermined number of JOBs on one screen displayed on the display operation unit according to a reservation order to be output, (ii) displays a list of the JOBS which is switchable by a page or scrollable by an operation of a user when a number of JOBs becomes more than the predetermined number, (iii) updates the display of the displayed list when there is a change in a status of one of the JOBs, (iv) selects a JOB in the displayed list according to an instructing operation of the user, (v) executes the instructing operation for the selected JOB, and (vi) maintains at least the selected JOB displayed on the screen to be displayed on the screen when the display needs to be updated by the switching or the scrolling in a case where the display of the displayed list is updated, and
wherein the control unit defines a display position of the selected JOB so that the selected JOB is displayed at a position where the selected JOB is not hidden by a display of a pop-up screen for the instructing operation when the instructing operation for the selected JOB is input, the pop-up screen being displayed so as to be superimposed on the list.

2. The image forming apparatus according to claim 1, wherein the control unit updates the display of the list such that a JOB is added to a tail position of the list by a new reservation, a JOB at a top position is deleted by completion of the output thereof, and a subsequent JOB is raised to the top position by the deletion of the JOB which was displayed at the top position and then is displayed at the top position.

3. The image forming apparatus according to claim 1, wherein the control unit changes display positions of all JOBs when updating the display of the list in a case where there is no selected JOB.

4. The image forming apparatus according to claim 1, wherein the control unit does not raise display positions of the JOBs in the display list on a display page with the selected JOB regardless of the completion of the output of the JOBs in a case where there is the selected JOB.

5. The image forming apparatus according to claim 1, wherein the control unit does not raise display positions of the JOBs in the display list on a display page with the selected JOB regardless of the completion of the output of the JOBs when there is the selected JOB, and switches the display page by deducting one from a page number of the display page at a time point at which the output of the number of JOBs corresponding to the number of JOBs for one page is completed.

6. The image forming apparatus according to claim 1, wherein the control unit updates the display of the list by sequentially raising the JOBs with the completion of the output of one of the JOBs until the selected JOB is positioned at a top position in the display list on a display page with the selected JOB when there is the selected JOB and does not raise the display position of the selected JOB in the display list with the completion of the output of the JOB after the selected JOB is positioned at the top position of the display list.

7. The image forming apparatus according to claim 1, wherein the control unit updates the display of the list by sequentially raising the JOBs with the completion of the output of one of the JOBs until the selected JOB is positioned at a top position in the display list on a display page with the selected JOB when there is the selected JOB and switches the display page to a previous page when the selected JOB moves from the top position of the display list of the display page to the previous page.

8. The image forming apparatus according to claim 1, wherein the pop-up screen is displayed so as to check the execution of the instructing operation.

9. An image forming method for an image forming apparatus which has a display operation unit which enables display of a JOB and an input of an operation for the JOB, an image being formed by the image forming apparatus based on the JOB, the method comprising:
    arranging a predetermined number of JOBs on one screen displayed the display operation unit according to a reservation order to be output;
    displaying a list of the JOBS which is switchable by a page or scrollable by an operation of a user when a number of JOBs becomes more than the predetermined number,
    updating the display of the displayed list when there is a change in a status of one of the JOBs,
    selecting a JOB in the displayed list according to an instructing operation of the user,
    executing the instructing operation for the selected JOB, and
    maintaining at least the selected JOB displayed on the screen to be displayed on the screen when the display needs to be updated by the switching or the scrolling of the page in a case where the display of the displayed list is updated,
    wherein a display position of the selected JOB is defined so that the selected JOB is displayed at a position where the selected JOB is not hidden by a display of a pop-up screen for the instructing operation when the instructing operation for the selected JOB is input, the pop-up screen being displayed so as to be superimposed on the list.

10. The image forming method according to claim 9, wherein the display of the list is updated such that a JOB is added to a tail position of the list by a new reservation, a JOB at a top position is deleted by completion of the output thereof, and a subsequent JOB is raised to the top position by the deletion of the JOB which was displayed at the top position and then is displayed at the top position.

11. The image forming method according to claim 9, wherein display positions of all JOBs are changed when updating display of the list in a case where there is no selected JOB.

12. The image forming method according to claim 9, wherein display positions of the JOBs are not raised in the display list on a display page with the selected JOB regardless of the completion of the output of the JOBs in a case where there is the selected JOB.

13. The image forming method according to claim 9, wherein display positions of the JOBs are not raised in the display list on a display page with the selected JOB regardless of the completion of the output of the JOBs when there is the selected JOB and the display page is switched by deducting one from a page number of the display page at a time point at which the output of the number of JOBs corresponding to the number of JOBs for one page is completed.

14. The image forming method according to claim 9, wherein the display of the list is updated by sequentially raising the JOBs with the completion of the output of one of the JOBs until the selected JOB is positioned at a top position of the display list in a display page with the selected JOB when there is the selected JOB and the display position of the selected JOB is not raised in the display list with the completion of the output of the JOB after the selected JOB is positioned at the top position of the display list.

15. The image forming method according to claim 9, wherein the display of the list is updated by sequentially raising the JOBs with the completion of the output of one of the JOBs until the selected JOB is positioned at a top position in the display list on a display page with the selected JOB when there is the selected JOB and the display page is switched to a previous page when the selected JOB moves from the top position of the display list on the display page to the previous page.

16. The image forming method according to claim 9, wherein the pop-up screen is displayed so as to check the execution of the instructing operation.

17. An image forming apparatus comprising:
    an image forming unit which forms an image based on a JOB;
    a display operation unit which enables display of the JOB and an input of an operation for the JOB; and
    a control unit which manages the JOB and controls the image forming unit and the display operation unit,
    wherein the control unit (i) arranges a predetermined number of JOBs on one screen displayed on the display operation unit according to a reservation order to be output, (ii) displays a list of the JOBS which is switchable by a page or scrollable by an operation of a user when a number of JOBs becomes more than the predetermined number, (iii) updates the display of the displayed list when there is a change in a status of one of the JOBs, (iv) selects a JOB in the displayed list according to an instructing operation of the user, (v) executes the instructing operation for the selected JOB, and (vi) maintains at least the selected JOB displayed on the screen to be displayed on the screen when the display needs to be updated by the switching or the scrolling in a case where the display of the displayed list is updated, and
    wherein the control unit displays the selected JOB at a top position or a tail position of the list of the screen and displays a pop-up screen for the instructing operation at a position where the selected JOB is not hidden when the instructing operation for the selected JOB is input, the pop-up screen being displayed so as to be superimposed on the list.

18. The image forming apparatus according to claim 17, wherein the control unit updates the display of the list such that a JOB is added to the tail position of the list by a new reservation, a JOB at the top position is deleted by completion of the output thereof, and a subsequent JOB is raised to the top position by the deletion of the JOB which was displayed at the top position and then is displayed at the top position.

19. The image forming apparatus according to claim 17, wherein the control unit changes display positions of all JOBs when updating the display of the list in a case where there is no selected JOB.

20. The image forming apparatus according to claim 17, wherein the control unit does not raise display positions of the JOBs in the display list on a display page with the selected JOB regardless of the completion of the output of the JOBs in a case where there is the selected JOB.

21. The image forming apparatus according to claim 17, wherein the control unit does not raise display positions of the JOBs in the display list on a display page with the selected JOB regardless of the completion of the output of the JOBs when there is the selected JOB, and switches the display page by deducting one from a page number of the display page at a time point at which the output of the number of JOBs corresponding to the number of JOBs for one page is completed.

22. The image forming apparatus according to claim 17, wherein the control unit updates the display of the list by sequentially raising the JOBs with the completion of the output of one of the JOBs until the selected JOB is positioned at the top position in the display list on a display page with the selected JOB when there is the selected JOB and does not raise the display position of the selected JOB in the display list with the completion of the output of the JOB after the selected JOB is positioned at the top position of the display list.

23. The image forming apparatus according to claim 17, wherein the control unit updates the display of the list by sequentially raising the JOBs with the completion of the output of one of the JOBs until the selected JOB is positioned at the top position in the display list on a display page with the selected JOB when there is the selected JOB and switches the display page to a previous page when the selected JOB moves from the top position of the display list of the display page to the previous page.

24. The image forming apparatus according to claim 17, wherein the pop-up screen is displayed so as to check the execution of the instructing operation.

25. An image forming method for an image forming apparatus which has a display operation unit which enables display of a JOB and an input of an operation for the JOB, an image being formed by the image forming apparatus based on the JOB, the method comprising:
arranging a predetermined number of JOBs on one screen displayed the display operation unit according to a reservation order to be output;
displaying a list of the JOBS which is switchable by a page or scrollable by an operation of a user when a number of JOBs becomes more than the predetermined number;
updating the display of the displayed list when there is a change in a status of one of the JOBs;
selecting a JOB in the displayed list according to an instructing operation of the user;
executing the instructing operation for the selected JOB; and
maintaining at least the selected JOB displayed on the screen to be displayed on the screen when the display needs to be updated by the switching or the scrolling of the page in a case where the display of the displayed list is updated,
wherein the selected JOB is displayed at a top position or a tail position of the list of the screen and displays a pop-up screen for the instructing operation at a position where the selected JOB is not hidden when the instructing operation for the selected JOB is input, the pop-up screen being displayed so as to be superimposed on the list.

26. The image forming method according to claim 25, wherein the display of the list is updated such that a JOB is added to the tail position of the list by a new reservation, a JOB at the top position is deleted by completion of the output thereof, and a subsequent JOB is raised to the top position by the deletion of the JOB which was displayed at the top position and then is displayed at the top position.

27. The image forming method according to claim 25, wherein display positions of all JOBs are changed when updating display of the list in a case where there is no selected JOB.

28. The image forming method according to claim 25, wherein display positions of the JOBs are not raised in the display list on a display page with the selected JOB regardless of the completion of the output of the JOBs in a case where there is the selected JOB.

29. The image forming method according to claim 25, wherein display positions of the JOBs are not raised in the display list on a display page with the selected JOB regardless of the completion of the output of the JOBs when there is the selected JOB and the display page is switched by deducting one from a page number of the display page at a time point at which the output of the number of JOBs corresponding to the number of JOBs for one page is completed.

30. The image forming method according to claim 25, wherein the display of the list is updated by sequentially raising the JOBs with the completion of the output of one of the JOBs until the selected JOB is positioned at the top position of the display list in a display page with the selected JOB when there is the selected JOB and the display position of the selected JOB is not raised in the display list with the completion of the output of the JOB after the selected JOB is positioned at the top position of the display list.

31. The image forming method according to claim 25, wherein the display of the list is updated by sequentially raising the JOBs with the completion of the output of one of the JOBs until the selected JOB is positioned at the top position in the display list on a display page with the selected JOB when there is the selected JOB and the display page is switched to a previous page when the selected JOB moves from the top position of the display list on the display page to the previous page.

32. The image forming method according to claim 25, wherein the pop-up screen is displayed so as to check the execution of the instructing operation.

* * * * *